W. B. GAROUTTE.
Cotton and Seed Planting Machine.

No. 224,418. Patented Feb. 10, 1880.

WITNESSES:
Henry N. Miller
C. Sedgwick

INVENTOR:
W. B. Garoutte
BY Munn & Co.
ATTORNEYS.

UNITED STATES PATENT OFFICE.

WILLIAM B. GAROUTTE, OF REPUBLIC, MISSOURI.

COTTON AND SEED PLANTING MACHINE.

SPECIFICATION forming part of Letters Patent No. 224,418, dated February 10, 1880.

Application filed October 13, 1879.

*To all whom it may concern:*

Be it known that I, WILLIAM B. GAROUTTE, of Republic, in the county of Greene and State of Missouri, have invented a new Improvement in Cotton-Seed-Planting Machinery, of which the following is a specification.

My improvement relates to machines for forming a mold or ridge, dropping the seed along the ridge, and covering the seed.

Figure 1:
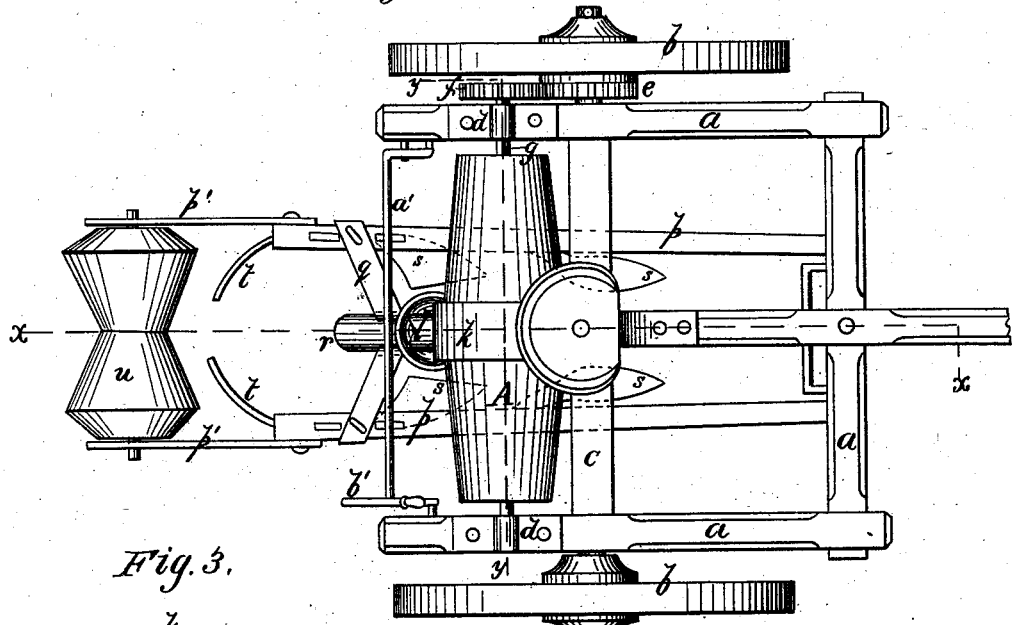
Figure 3:
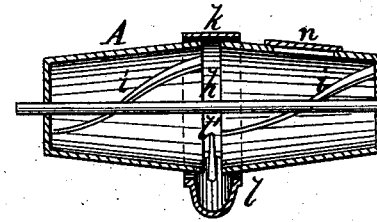
Figure 2:
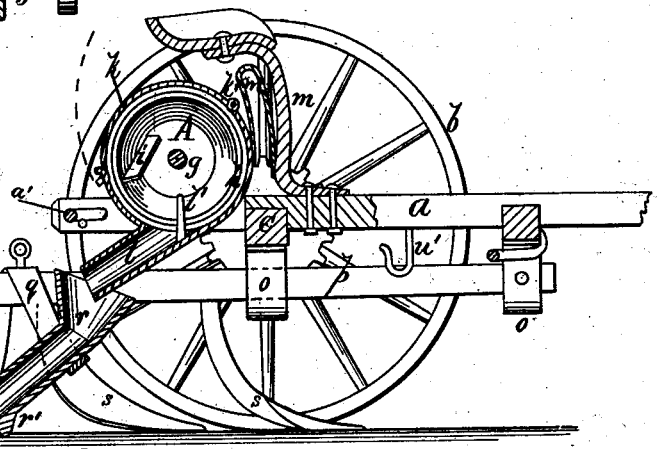
Figure 4:
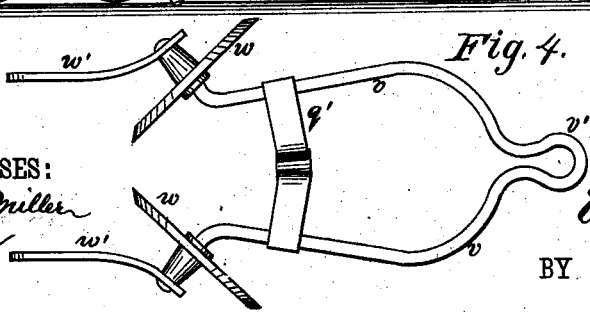

In the drawings, Figure 1 is a plan view of the machine. Fig. 2 is a vertical longitudinal section on line $x\,x$ of Fig. 1. Fig. 3 is a section lengthwise of the seed-barrel or transversely of the machine on line $y\,y$ of Fig. 1. Fig. 4 is a plan view of an attachment fitted with revolving plows for use on mellow soil.

Similar letters of reference indicate corresponding parts.

The frame $a$ of the machine is carried by two wheels, $b$, which are upon the axle-tree $c$. Upon the rear part of frame $a$ in bearings $d$ is a cross-shaft, $g$, carrying the revolving seed-barrel A, the barrel being revolved by a gear-wheel, $e$, that is attached to the hub of one wheel $b$, and meshes with a gear-wheel, $f$, on the end of shaft $g$. The seed-barrel A is formed with its sides flaring outward from the ends to the middle, and is divided crosswise at its mid-length to form an annular slot, $h$. Upon the inner surface of the barrel curved or spiral flights or conveyers $i$ are fitted, which act to carry the seed to the slot $h$. Around the barrel A, and covering the slot $h$, is a sheet-metal band, $k$, having attached to it the delivery-spout $l$. This band $k$ is made in two pieces hinged together at one end by a knuckle-joint, $k'$, and formed at the other ends with a suitable catch for connection together, and the band $k$ is also attached to spring-arm $m'$, that is attached to the standard $m$ of the driver's seat.

At the upper end of spout $l$ is fixed a pin, $l'$, projecting through slot $h$ to keep the slot free, and in the side of barrel A is an opening for allowing seed to be put in, which opening is fitted with a sliding door, $n$.

Beneath the frame $a$ in the yokes $o$ is suspended the frame carrying the molding-plows. This frame consists of parallel bars $p\,p$, that are hung by cross-pins in the forward yoke $o$, and swing freely up and down in the rear yoke $o$. Between the bars $p$, connected by the removable strap $q$, is hung the seed-delivery spout $r$ in a position for receiving the seed from spout $l$ and delivering the same at the top of the ridge, the spout $r$ being provided at its end with a projecting marker, $r'$.

The plows $s$ are fitted in advance of the spout $r$, two upon each bar $p$, and are formed to raise the soil and turn the same inward to form a ridge. Behind the spout $r$ are the eveners $t$, that consist of curved metal plates attached rigidly to the bars $p$, and act to give proper shape and form to the ridge. At the rear of bars $p$ in the arms $p'$ the covering and smoothing roller $u$ is hung. This roller $u$ is formed with a concave face, which runs upon the top of the ridge to press the soil compactly and cover the seed.

In operation, as the machine is drawn forward the seed is caused to feed regularly to the spout $l$ by the pin $l'$, which prevents the seed catching by the lint in the groove $h$, and from the spout $l$ the seeds pass through the spout $r$ to the top of the ridge formed by the plows $s$. The roller $u$ covers the seed and packs the ground compactly.

Upon broken or mellow soil, where the plows $s$ are not required, the attachment shown in Fig. 4 may be used. This consists of the metal rod or frame $v$, bent in U form, with the eye $v'$ formed at the forward part for connection to the hook $u'$, that is attached on frame $a$, and with the rotary plows $w$ attached at the rear ends. These rotary plows $w$ consist of metal disks of circular form with beveled edges, and are fitted at an inclination to each other, the axis of the two plows diverging outward at an angle of about forty-five degrees to the center line of draft.

To the rear ends of frame $v$ are spring-arms $w'$, for carrying the covering-roller $u$, and to the frame $v$ is attached a strap, $g'$, for supporting the delivery-spout $r$ in the manner before described. In using this attachment the bars $p$, with the plows $s$, will be removed from the machine. The plows $w$ will act in advance of the seed-spout $r$ to throw the ground to the center and form a ridge. Across the machine is fitted a bent or crank shaft, $a'$, with a handle, $b'$, for raising or lowering the frame $v$ and regulating the depth at which the plows $w$ act. The frame $v$ will rest upon the shaft $a'$ or be connected thereto by cords or chains.

The above construction furnishes a simple and durable machine, which will accomplish the work of forming a mold or ridge, planting the seed in a straight line, and covering the seed in a rapid and effective manner. By having these operations performed in the manner stated the subsequent work of scraping, thinning, and dirting may be accomplished with much less labor than heretofore required and by attachments used on the above machine. Such attachments I have devised, and intend to secure by Letters Patent by a separate application.

Having thus described my invention, what I claim as new, and desire to secure by Letters Patent, is—

The combination, with pivoted drag-bars $p$ $p$, of the strap $q$ and spout $r$ $r'$, the latter arranged with respect to the spout $l$ as specified.

WILLIAM B. GAROUTTE.

Witnesses:
WILLIAM CLIBORNE,
ANTHONY McROBERTSON.